United States Patent
Austin et al.

(10) Patent No.: US 10,078,751 B2
(45) Date of Patent: Sep. 18, 2018

(54) COMPUTER DEVICE AND METHOD FOR CONTROLLING UNTRUSTED ACCESS TO A PERIPHERAL DEVICE

(71) Applicant: Avecto Limited, Manchester (GB)

(72) Inventors: Mark James Austin, Manchester (GB); John Goodridge, Cheshire (GB)

(73) Assignee: Avecto Limited, Manchester (GB)

( * ) Notice: Subject to any disclaimer, the term of this patent is extended or adjusted under 35 U.S.C. 154(b) by 221 days.

(21) Appl. No.: 15/097,968

(22) Filed: Apr. 13, 2016

(65) Prior Publication Data

US 2016/0306963 A1 Oct. 20, 2016

(30) Foreign Application Priority Data

Apr. 14, 2015 (GB) .................................. 1506333.2

(51) Int. Cl.
| | |
|---|---|
| *G06F 21/53* | (2013.01) |
| *H04L 29/08* | (2006.01) |
| *G06F 21/56* | (2013.01) |
| *G06F 21/57* | (2013.01) |

(52) U.S. Cl.
CPC ............ *G06F 21/53* (2013.01); *G06F 21/566* (2013.01); *G06F 21/57* (2013.01); *H04L 67/306* (2013.01)

(58) Field of Classification Search
CPC ........ G06F 21/53; G06F 21/57; G06F 21/566; H04L 67/306
See application file for complete search history.

(56) References Cited

U.S. PATENT DOCUMENTS

| | | | | |
|---|---|---|---|---|
| 5,974,549 | A * | 10/1999 | Golan .................... | G06F 9/468 714/47.3 |
| 9,323,921 | B2 * | 4/2016 | Hunt ....................... | G06F 21/53 |
| 2003/0023732 | A1 * | 1/2003 | Cohen .................... | H04L 29/06 709/229 |
| 2003/0167336 | A1 * | 9/2003 | Iwamoto ............... | G06F 21/604 709/229 |

(Continued)

OTHER PUBLICATIONS

Microsoft Corp. "Assigning Delegated Print Administrator and Printer Permission Settings in Windows Server 2008 R2", Sep. 24, 2009, retrieved from "https://technet.microsoft.com/en-us/library/ee524015(v=ws.10).aspx#Configuring security settings".*

(Continued)

*Primary Examiner* — Robert Leung
*Assistant Examiner* — Thomas Ho
(74) *Attorney, Agent, or Firm* — Knobbe, Martens, Olson & Bear, LLP

(57) ABSTRACT

A computer device includes hardware with a connected peripheral device such as a camera or a microphone. An operating system is configured to operate the peripheral device using a device driver and a representative device object. An agent is configured to apply security attributes to the device object which permit access from a primary user account while preventing direct access to the device object by a secondary user account in a sandbox. The agent may intercept requests made toward the device object, examine each request, and then satisfy the request, when the request is allowed, by selectively arranging access to the device object from the sandboxed secondary user account.

20 Claims, 11 Drawing Sheets

(56) References Cited

U.S. PATENT DOCUMENTS

| | | | | |
|---|---|---|---|---|
| 2006/0026684 | A1* | 2/2006 | Harvey | G06F 21/53 726/23 |
| 2006/0229741 | A1* | 10/2006 | Achanta | G06F 9/4406 700/23 |
| 2007/0043550 | A1* | 2/2007 | Tzruya | G06F 9/4445 703/24 |
| 2007/0103712 | A1* | 5/2007 | Corona | G06F 21/335 358/1.14 |
| 2012/0254957 | A1* | 10/2012 | Fork | G06F 21/33 726/6 |
| 2013/0167222 | A1* | 6/2013 | Lewis | G06F 21/53 726/17 |
| 2014/0033304 | A1* | 1/2014 | Lewis | G06F 21/53 726/22 |
| 2016/0292460 | A1* | 10/2016 | Boysen | G06F 21/31 |
| 2017/0228326 | A1* | 8/2017 | Depeyrot | G06F 12/1425 |

OTHER PUBLICATIONS

Print Manager "Sharing a Printer in the Windows Workgroup Environment", 2014, http://www.printmanager.com/cms.php?aid=111&fullpage=1&support=8.*

Microsoft Corp. "Print Management Step by Step Guide", Mar. 26, 2014, retrieved from "https://technet.microsoft.com/en-us/library/cc753109(v=ws.10).aspx".*

* cited by examiner

COMPUTER DEVICE AND METHOD FOR CONTROLLING UNTRUSTED ACCESS TO A PERIPHERAL DEVICE

CROSS REFERENCE TO RELATED APPLICATIONS

This application claims priority under 35 U.S.C. § 119 to United Kingdom Application No. 1506333.2, filed Apr. 14, 2015, the disclosure of which is hereby incorporated by reference herein in its entirety.

BACKGROUND

Field

The present invention relates generally to the field of computers and computer devices. More particularly, the present invention relates to a computer device and a method for controlling untrusted access to a peripheral device.

Description of Related Art

There is an on-going need to protect computer devices from malicious activity, as is well recognised in the field of computer security. In particular, it is desired to protect computer devices from attacks against peripheral devices, such as malicious access to a webcam or a microphone.

Generally, a peripheral device connects to and works with the computer device as an auxiliary, to provide an additional capability beyond the ordinary abilities of the computer device. Peripheral devices typically provide an auxiliary input, output and/or storage functions. For example, peripheral devices for input functions typically include keyboards, mice, cameras (webcams) and microphones. Peripheral devices with output functions may include displays, printers and speakers. Some devices, such as modems and network interface controllers, may be both input and output peripheral devices. Storage devices, such as DVD drives and solid state memory (Flash drives), may be provided as peripheral devices. Peripheral devices are typically physically separate devices which are located external to a main housing or casing of the computer device and are connected via an appropriate local physical interface (e.g. a USB port). However, it is also known to provide peripheral devices which reside within the computer device or are physically integrated with the computer device.

A challenge arises in that malicious code (malware) may hijack a peripheral device for unauthorised purposes, such as to obtain personal or confidential information. Peripheral devices are typically user-driven, such that applications receive input from or send output to the peripheral devices only in response to interaction or command by a user. However, malicious software may access the peripheral devices even in the absence of any interaction from the user. In practice, malware may access the peripheral devices through relevant calling functions (e.g. through a device API), independently of any request originating from the user. For example, malicious software may access a webcam connected to the computer device and monitor or record the user or an environment of the computer device without any knowledge of the user. Additionally, such malicious software may access a microphone connected to the computer device and also surreptitiously monitor or record the user or their surroundings. Further, malware may access a keyboard connected to the computer device and covertly record keystrokes, which may be analysed for sensitive data such as passwords or bank account details. Still further, malware may monitor when peripheral devices are connected to the computer device and then secretly access, for example, a content of a flash drive temporarily connected to the computer device. Alternatively, malicious software may access the peripheral devices through intentional or non-intentional user interaction. For example, malicious software may exploit user interactions in an untrusted source to access a normally trustworthy or secure destination or to monitor or record the user interactions, thus introducing an additional vector of attack. Still further, malware may hijack the peripheral devices and corrupt or prevent access to them by the legitimate user.

Typically, each peripheral device is controlled by a respective device driver. The device driver is a software interface to the peripheral device that allows access the peripheral device, usually agnostically. Usually, any requests which are directed towards the peripheral device are made first to the device driver which, in turn, sends commands to the peripheral device. Conversely, data from the peripheral device is sent to the device driver and then forwarded to a requestor within the computer device. Device drivers are often individual to a particular peripheral device and may be operating system-dependent. Device drivers are often supplied by manufacturers of each peripheral device, but may also be provided by third parties.

Many operating systems include a kernel which manages requests that are directed towards each peripheral device, by allocating those requests to the respective device driver. The kernel may also provide interfaces for applications running on the computer device to access the peripheral devices. These interfaces are typically abstractions of the device drivers and isolate the device drivers from the applications. Hence, for an object-oriented operating system, peripheral devices may be represented as securable objects (often term 'device objects') for applications wishing to access them. Thus, for example, an application requesting data from the peripheral device makes a request to a device object representing the peripheral device. The request is subsequently allocated to the device driver by the operating system and the device driver in turn forwards corresponding commands to the peripheral device.

Most object-oriented operating systems also provide a mechanism to install and manage device drivers, and to create and manage device objects associated with the device drivers. Particularly, the operating system may provide a device object Application Program Interface (API) thereby allowing peripheral devices attached to the computer device to be detected, details of these peripheral devices to be retrieved, and properties of these peripheral devices to be set by the applications. In this way, the peripheral devices may be accessed and controlled by the applications running on the computer device.

As one example, in the Apple 'OS X' family of operating systems, a device object API is provided by IOKitLib API, comprising a set of functions that allow applications to access the peripheral devices through associated device interfaces. Particularly, a 'driver object' may be instantiated as a device object for a peripheral device connected to the computer device, through which the peripheral device may be accessed. Alternatively, POSIX API provides means of accessing the peripheral devices through associated device files.

In the Microsoft Windows family of operating systems, the device object API is provided by a 'Windows Device Installation' or SetupAPI, comprising a set of functions which provides means to manage device information sets and device objects. In this way, instance paths of device objects (together with associated friendly names) related to integral or external hardware devices attached to the computer device may be retrieved, allowing connected peripheral devices to be detected. For example, device object API function SetupDiGetClassDevs returns a device information set that contains all devices of a specified class; device object API function SetupDiEnumDeviceInterfaces returns a context structure for a device interface element of a device information set; device object API function SetupDiGetDeviceInterfaceDetail returns details about a particular device interface; device object API function SetupDiEnumDeviceInfo returns a context structure for a device information element of a device information set; and SetupDiGetDeviceRegistryProperty retrieves a specified Plug and Play device property. These device object API functions may provide information regarding any peripheral device that has ever been accessed by any application that has run on the computer device. However, those peripheral devices that are not currently connected may be readily filtered, if required.

In addition, the device object API may be employed to control access to peripheral devices. For example, on Microsoft Windows, device object API function SetupDiSetDeviceProperty may be used to set a device instance property; device object API function SetupDiCallClassInstaller may be used to call an appropriate class installer, and any registered co-installers, with a specified installation request; device object API function SetupDiSetClassInstallParams may be used to set or clear class install parameters for a device information set or a particular device information element; and device object API function SetupDiChangeState is a default handler for a DIF_PROPERTYCHANGE installation request. Particularly, device object API functions SetupDiSetClassInstallParams and SetupDiChangeState are required in order to change user access dynamically since Microsoft Windows will only apply device object security state changes when the computer device is rebooted if device object API function SetupDiSetDeviceProperty is called.

Notably, it is normally not possible to deny access to a particular peripheral device if that peripheral device is already being accessed, e.g. by a running application. Typically, the operating system does not dynamically apply a more restrictive access control than that applied at when the peripheral device was first accessed. Any restrictive access permissions are stored and applied at restart, before any application has acquired a handle to the peripheral device.

Considering these example arrangements for providing access to peripheral devices, it will be appreciated that malware may relatively easily identify which peripheral devices are connected to the computer device and to access these connected peripheral devices, e.g. using the device object API functions described above. In this way, malware may stealthily access information which is input to, or output from, the peripheral devices. Any one of these actions may provide an opportunity to perform malicious acts on the computer device.

In the related art, it is known to isolate untrusted content by limiting the resources of the computer device which are accessible by the untrusted content. A difficulty arises in that many of the current mechanisms for content isolation are relatively insecure, in that they still allow malicious content to reach important resources of the computer device. Also, many known implementations of content isolation are relatively resource intensive, such as by needing a relatively large amount of memory, disc space or computer processing power.

As a further difficulty, content isolation often requires a relatively skilled and knowledgeable user of the computer device. Therefore, it is quite difficult for an ordinary user to implement content isolation in a way which is safe, effective and reliable, yet also simple and intuitive. In some cases, content may need to be adapted in advance for the purposes of isolation, by being specifically prepared in a manner capable of being isolated, which increases costs and makes content isolation less likely to be implemented in practice.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device as in claim 1, a method as in claim 11 and a non-transitory computer-readable storage medium as in claim 20. Other, optional, features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In one example, a computer device includes hardware with a connected peripheral device such as a camera or a microphone. An operating system is configured to operate the peripheral device using a device driver and a representative device object. An agent, within or alongside the operating system, is configured to apply security attributes to the device object which permit access from regular user processes in a primary user account while preventing direct access to the device object by a secondary user account in a sandbox. The agent may intercept requests made toward the device object, examine each request, and then satisfy the request, when the request is allowed, by selectively arranging access to the device object from the sandboxed secondary user account.

In one example there is described a computer device, comprising: a hardware layer comprising a processor, a memory, and a peripheral device such as a camera or a microphone; an operating system executed by the hardware layer, wherein the operating system is configured to: perform an operation on the peripheral device using a device driver which drives the peripheral device and a device object as an object representing the peripheral device; operate a primary user account comprising a user process, wherein the device object is accessible by the user process; and support a secondary user account, derived from the primary user account, which isolates an untrusted process therein; and an agent executed in cooperation with the operating system, wherein the agent is configured to: apply security attributes to the device object which permit access to the device object by the primary user account while preventing direct access to the device object by the secondary user account; intercept a request from the secondary user account made toward the device object in relation to the operation of the peripheral device; examine the request to selectively allow or deny access to the peripheral device from the secondary user account; and satisfy the request, when the request is allowed, by arranging access to the device object.

In one example, the security attributes of the device object are derived according to a security identifier of the secondary user account.

In one example, the security attributes of the device object are derived according to the security identifier of the secondary user account to deny access to the peripheral device from the secondary user account.

In one example, the security attributes of the device object are derived according to a security identifier of the primary user account.

In one example, the security attributes of the device object are derived according to the security identifier of the primary user account to permit access to the peripheral device from the primary user account.

In one example, the agent is configured to examine the request in order to selectively allow or deny access to the peripheral device from the secondary user account by checking a policy rule.

In one example, the agent is configured to determine a type of the peripheral device, and to apply the security attributes to the device object according to the type of the peripheral device.

In one example, the agent is configured to determine when the peripheral device is newly-connected to the computer device and to apply the security attributes to the device object before the request from the secondary user account is made toward the device object.

In one example, the agent is configured to programmatically provide the secondary user account.

In one example, the agent is configured to satisfy the request by acting as a proxy for the request, wherein the agent is configured to forward a proxy request in response to the request from the secondary user account.

In one example, the agent is configured to return a result of the proxy request to the secondary user account in response to the request from the secondary user account.

In one example, the agent is configured to satisfy the request by providing an impersonation token to the secondary user account.

In one example, the agent is configured to create the impersonation token and return the impersonation token to the secondary user account in response to the request from the secondary user account.

In one example there is described a method for controlling access to a peripheral device, such as a camera or a microphone, on a computer device, the method being implemented by hardware of the computer device including at least a processor, a memory and the peripheral device, the method comprising: supporting an operation on the peripheral device using a device driver which drives the peripheral device and a device object as an object representing the peripheral device, by an operating system of the computer device; operating a primary user account comprising a user process, wherein the device object is accessible by the user process; establishing a secondary user account, derived from the primary user account, which isolates an untrusted process therein; applying security attributes to the device object which permit access to the device object by the primary user account while preventing direct access to the device object by the secondary user account; intercepting a request from the secondary user account made toward the device object in relation to the operation of the peripheral device; examining the request to selectively allow or deny access to the peripheral device from the secondary user account; and when the request is allowed, satisfying the request by arranging access to the device object.

In one example, the step of applying security attributes to the device object includes applying security attributes to the device object wherein the security attributes of the device object are derived according to a security identifier of the secondary user account.

In one example, the step of applying security attributes to the device object includes applying security attributes to the device object wherein the security attributes of the device object are derived according to the security identifier of the secondary user account to deny access to the peripheral device from the secondary user account.

In one example, the step of applying security attributes to the device object includes applying security attributes to the device object wherein the security attributes of the device object are derived according to a security identifier of the primary user account.

In one example, the step of applying security attributes to the device object includes applying security attributes to the device object wherein the security attributes of the device object are derived according to the security identifier of the primary user account to permit access to the peripheral device from the primary user account.

In one example, the step of examining the request to selectively allow or deny access to the peripheral device from the secondary user account comprises checking a policy rule.

In one example, the method further comprises determining a type of the peripheral device and applying the security attributes to the device object according to the type of the peripheral device.

In one example, the method further comprises determining when the peripheral device is newly-connected to the computer device and applying the security attributes to the device object before the request from the secondary user account is made toward the device object.

In one example, the method further comprises providing the secondary user account.

In one example, the step of satisfying the request comprises acting as a proxy for the request, comprising forwarding a proxy request in response to the request from the secondary user account.

In one example, the step of acting as a proxy for the request further comprises returning a result of the proxy request to the secondary user account in response to the request from the secondary user account.

In one example, the step of satisfying the request comprises providing an impersonation token to the secondary user account.

In one example, the step of providing the impersonation token to the secondary user account comprises creating the impersonation token and returning the impersonation token to the secondary user account in response to the request from the secondary user account.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following example embodiments provide an improved mechanism for controlling untrusted access to a peripheral device in a computer device. Advantageously, some of the example embodiments may leverage inherent security of an existing security model to provide a mechanism for access control using isolation environments. Many other advantages and improvements will be discussed in more detail herein.

Firstly, the concept of an isolation environment (or 'sandbox') will be discussed and explained in detail below with reference to FIGS. 1-6. Secondly, an example mechanism for controlling untrusted access to a peripheral device will be discussed in detail with reference to the example devices and methods shown in FIGS. 7-11.

Many operating systems apply a security model wherein access privileges are based on a user account. The operating system may define privilege levels appropriate to different classes, or groups, of users, and then apply the privileges of a relevant class or group to the particular logged-in user (e.g. ordinary user, super-user, local administrator, system administrator and so on). The user is authenticated by logging in to the computer device, and the user, via their previously prepared security account, acts as a security principal in the security model. The operating system of the computer device then grants appropriate privileges to processes which execute in that user's security context.

In practice, there is a widespread tendency to grant additional privilege rights, such as a local administrator level, or a system administrator level, to all members of a relevant user group, and thus allow access to almost all of the resources of the computer device. This level of access may be greater than is desirable or appropriate from a security viewpoint. For example, there is the possibility of accidental tampering with the computer device, leading to errors or corruption within the device. Further, a particular process (e.g. an infection or malware) may maliciously access key resources of the computer device with the deliberate intention of subverting security or causing damage.

Figure 1:
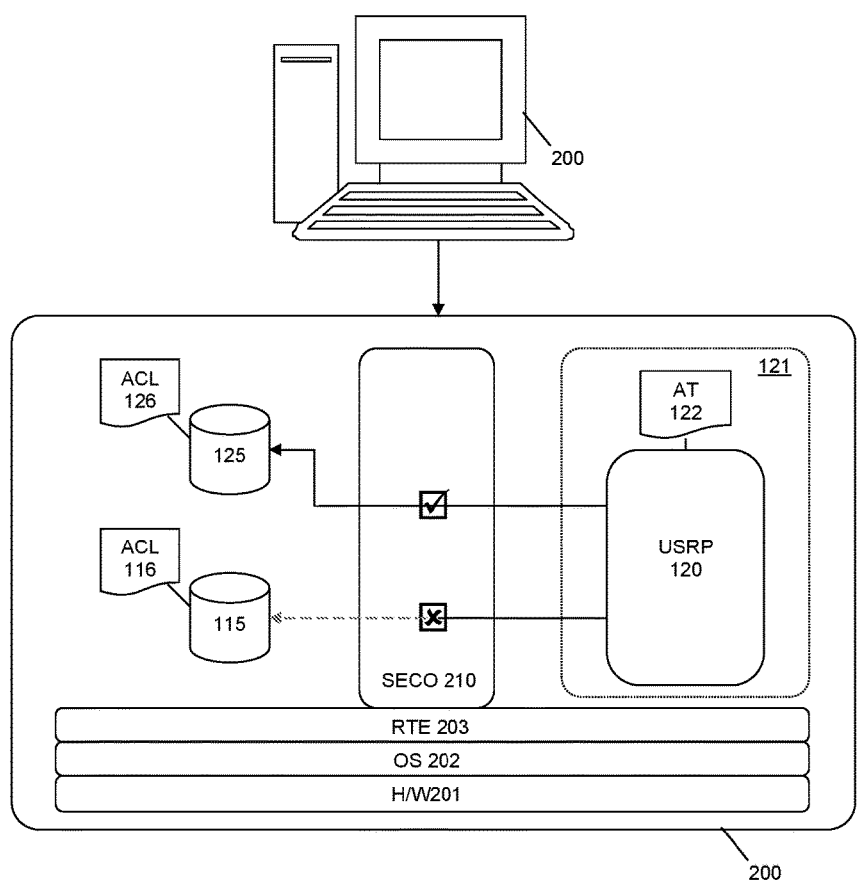
FIG. 1 is a schematic view of an example computer device.

FIG. 1 is a schematic overview of the computer device 200. The computer device 200 is configured to authenticate a user by an appropriate login procedure. For example, the user may log in to the computer device 200 with a user identity and password, and their user credentials may be validated locally or via a remote service such as a domain controller (e.g. an Active Directory domain controller).

Generally, the computer device 200 includes physical hardware (HW) 201 such as memory, processors (CPUs), I/O interfaces, backbone, power supply and so on. In use, the hardware 201 supports an operating system (OS) 202 that provides a multitude of components, modules and units that together coordinate to provide a runtime environment (RTE) 203. The runtime environment 203 in turn supports execution of a plurality of processes (USRP) 120. The example computer device 200 may further include a plurality of resources 115, 125. These resources 115, 125 are the components of the computer device that the plurality of processes 120 may rely upon in order to carry out their execution. For example, the resources 115, 125 may include installed software, system services, drivers, files and/or registry settings.

The example embodiments of the present invention will be discussed in detail in relation to computers and computer devices using the Windows™ family of operating systems provided by Microsoft Corporation of Redmond, Wash., USA. However, the teachings, principles and techniques of the present invention are also applicable in other example embodiments. For example, the example embodiments are also applicable to other operating systems, such as UNIX, Linux, and Apple 'OS X' type operating systems. In particular, the described examples are useful in many computer devices having a security model which employs discretionary access control.

As shown in FIG. 1, the operating system 202 may include a security module (SECO) 210 which is provided to enforce security within the computer device 200. As one example, the security module 210 is provided by the Windows operating system as supplied by under the trade marks Windows NT, Windows 2000, Windows XP, Windows Vista, Windows Server 2003, Windows Server 2008, Windows 7, Windows 8, and Windows 10, amongst others. The security module 210, which is also termed a security sub-system or security manager, suitably enacts the Windows security model as described, for example, in *"Windows Security Overview"* published 10 Jun. 2011 by Microsoft Corporation.

Generally, each process 120 that is initiated for a particular user will be run in a security context 121 that derives access rights and permissions from the user's security account. To this end, each process 120 is provided with an access token (AT) 122. The access token 122 typically carries a security identity (SID) of the user and SIDs of any other security groups to which the user belongs. The access token 122 thus defines the privileges as held on this computer 200 by the user and their relevant security groups.

In one example, the security module 210 is arranged to perform an access check when a process 120 requests access to any of the resource 115, 125. The security module 210 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

In FIG. 1, the security module (SECO) 210 in the operating system 202 is arranged to control access by the process 120 to the resources 115, 125 according to the respective access control list 116, 126. For example, a particular process 120 is able to read from, but not write to, a file of the first resource 115. Typically, the defined access types will depend upon the type of resource being accessed. For example, storage is typically defined by read and write access rights, while a process may have terminate access rights which determine whether or not a request to terminate that process will be actioned by the operating system 202. As noted above, the user-level security context 121 is based on the user as the security principal and the access token 122 is set accordingly. Suitably, in a system which adopts the least-privilege access model, the user-level security context 121 is deliberately restricted to a minimal set of access rights as a default, original privilege level.

Figure 2:
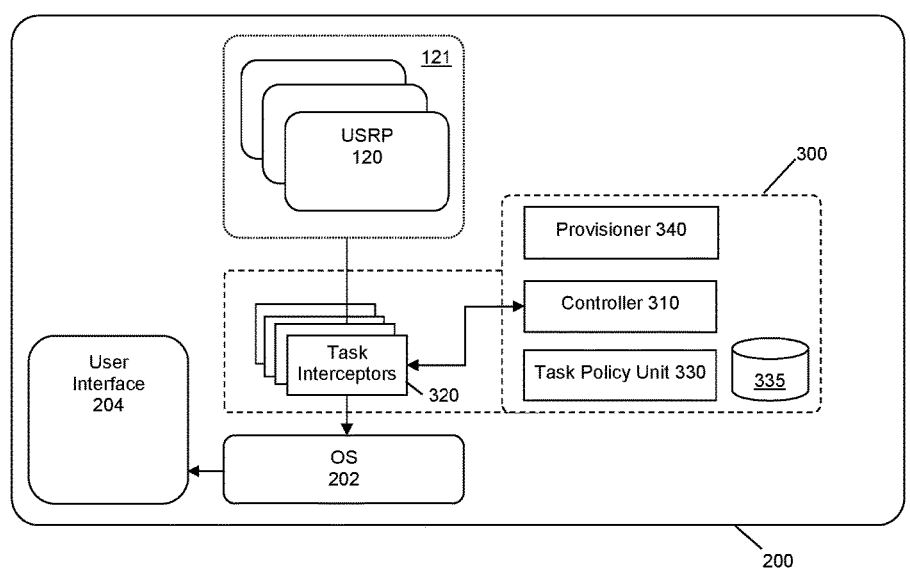
FIG. 2 is a more detailed schematic view of the example computer device.

FIG. 2 is a further schematic view of the computer device, including an example mechanism for isolating untrusted content. In one example, the mechanism applies task isolation functions in the computer device. The example mechanism is simple and convenient for the user, and is lightweight to implement. Further, the example embodiments are more secure than many other practical implementations.

FIG. 2 shows one or more user processes 120 that are currently executing in a corresponding user security context 121. The operating system 202 suitably provides a user interface component 204 which provides physical interactions with the user, including providing outputs to the user (e.g. by providing a graphical user interface (GUI) on a display screen) and receiving inputs from the user (e.g. via keyboard, mouse or other input devices). The user inputs received through the user interface 204 cause the user processes 120 to perform tasks. Typically, each task requires the user processes 120 to interact with relevant components of the operating system 202, most often via the security module 210 described before.

These user interactions may cause the computer device 200 to perform tasks, at least some of which may be defined in advance as being 'untrusted' tasks. For example, untrusted tasks may include certain forms of Web browsing, viewing email attachments, starting an untrusted application program, or accessing a particular file in a storage medium. Generally, the untrusted tasks may involve non-executable content (data) and/or may include executable content (code) which, at least initially, is not trusted. In the example embodiments, there is a need to isolate these untrusted tasks, so that these tasks are inhibited from interfering with other tasks or components of the computer device. Isolation is advantageous to inhibit interference, whether caused intentionally or unintentionally. Notably, 'untrusted' does not mean that the respective task is necessarily malicious. Instead, the untrusted task simply has the possibility of introducing undesired effects and, at least initially, it is desired to isolate the untrusted task away from most of the other resources or components of the computer device.

Often, as a practical example, there may be a need to open untrusted content within an already trusted application. For instance, an untrusted PDF document can be opened and viewed in a trusted document reader application (e.g. Adobe Acrobat Reader). A trusted Web browser (e.g. Internet Explorer) may be instructed by the user to view an untrusted website. Hence, there is an advantage in being able to isolate the trusted applications, at least temporarily, while untrusted content is being manipulated.

As shown in FIG. 2, in one example a content isolation agent 300 is provided to protect the computer device 200 from malicious attacks by untrusted content. In one example the content isolation agent 300 may be configured as software which executes using the underlying hardware 201. In the illustrated example the content isolation agent 300 is shown installed on the computer device 200, and suitably operates in close association with the native operating system 202. In one example, the content isolation agent 300 may operate alongside the operating system 202 and is installed on the computer device 200 in addition to a commodity operating system 202. In another example, the functions of the content isolation agent 300 may be integrated within the operating system 202, e.g. by releasing an adapted or modified form of the operating system 202. It will be appreciated that in order for the content isolation agent 300 to operate with or alongside the operating system in such manners, the content isolation agent 300 may be configured with privileged security attributes (e.g. at local administrator level or at system administrator level). In this example, the content isolation agent 300 includes a controller unit 310, one or more task interceptor units 320, a task policy unit 330 and a provisioner unit 340. These units 310-340 suitably represent functional components within the agent 300 as will be appreciated from the discussion herein.

The task interceptor units 320 are each arranged to intercept one or more respective tasks, when those tasks are instructed by the user processes 120. In one example, each task interceptor unit 320 is arranged to intercept certain tasks prior to implementation of those tasks by an intended target component within the operating system 202. Further, the interceptor units 320 may obtain task metadata concerning the intercepted task, and communicate that task metadata to the controller 310.

The policy unit 330 is configured to store policies relating to the intercepted tasks, suitably in a policy database 335 (e.g. recorded on a non-transient storage medium). The policy unit 330 interrogates the policy database 335 based on the provided task metadata and returns a policy result to the controller 310.

The controller 310 is configured to intervene selectively in relation to an intercepted task. The controller 310 may, for example, decide to block (deny) the requested task, allow the requested task to continue natively to reach an intended target in the operating system, or to isolate an untrusted task using an isolation environment. In one example, content isolation can be implemented multiple times simultaneously on the same computer device, i.e. multiple items of untrusted content may each be given their own isolation environment simultaneously.

In practice, many of the tasks which are instructed by the user processes 120 may proceed normally toward the intended target with minimal intervention, because these tasks do not relate to untrusted content. That is, the task interceptor units 320 will not interfere with a task which, e.g. by its type or nature, is not of interest to the agent 300, and may allow those tasks to proceed directly to the relevant target within the operating system 202. However, where a task is identified as potentially relating to untrusted content, then the task is intercepted and the controller 310 now has the opportunity to review the task using the policy unit 330 and to selectively intervene based on the obtained policy result. Suitably, the policies set with respect to the computer device 200 are capable of being adapted with any desired level of granularity. The policies within the policy unit 330 may be tailored appropriate to individual devices or individual users, if desired.

Figure 3:
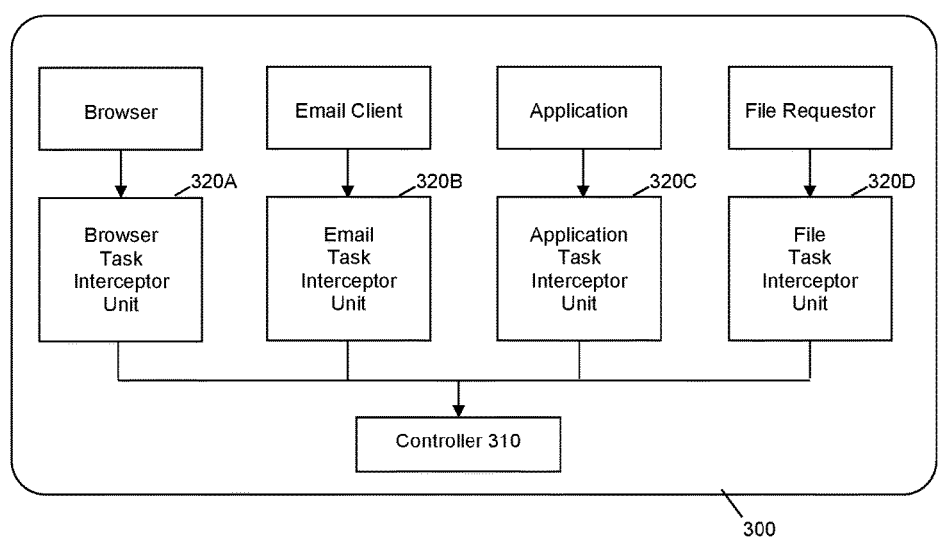
FIG. 3 is a further schematic view of the example computer device.

FIG. 3 is a schematic view of the task interceptor units 320 in more detail. In one example embodiment, the task interceptors 320 may include at least a browser task interceptor unit 320A, an email task interceptor unit 320B, an application task interceptor unit 320C, and a data file task interceptor unit 320D, amongst others.

The browser task interceptor unit 320A may include registering a plugin with a browser application. In one example, the plugin may be a browser helper object (BHO) plugin. This plugin notifies the respective task interceptor unit 320 of each web page that is requested by the user using the browser, prior to the web page being fetched by the browser application. The interceptor unit thus obtains task metadata about the respective task, in this case metadata about the requested web page about to be fetched, and passes this task metadata to the controller 310.

The email task interceptor unit 320B may be implemented as an add-on or plugin to an email client application, such as Outlook. In particular, the add-on or plugin may receive 'save to disc' notifications whenever the email client attempts to access data files on the disc. The task interceptor unit 320 may receive task metadata, which in this example concerns the data file to be accessed, the email which requested the access, and so on. The interceptor unit thus obtains task metadata about the respective task, in this case being metadata about the requested file access, and passes this task metadata to the controller 310.

The application task interceptor unit 320C may hook certain process and thread generation functions within the operating system, such as a 'CreateProcessInternal' function which creates a new process and its primary thread. This process creation function is called when starting a new application program. The interceptor unit thus obtains appropriate task metadata, in this case information about the intended application to be opened, and passes this metadata to the controller 310.

The file interceptor unit 320D may intercept tasks relevant to opening a stored file (i.e. tasks performed by the computer device in response to double-clicking a file in a file explorer process). The interceptor unit thus obtains the task metadata, in this case information about the intended data file to be opened, and passes this metadata to the controller 310.

Notably, a first particular example of the computer device 200 may have one particular first set of task interceptor units 320. Meanwhile, a second example computer device 200 may have a differing set of the task interceptors 320. Thus, the nature and type of the task interceptors 320 installed on the computer device may vary for each device.

Figure 4:
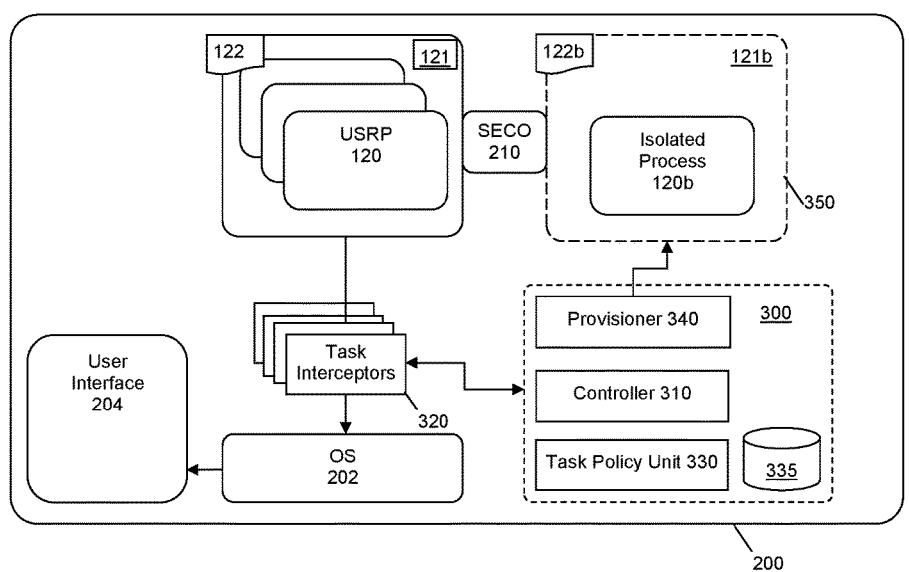
FIG. 4 is a further schematic view of the example computer device.

FIG. 4 is a schematic view of the computer device 200 with the content isolation agent 300 in operation.

Where the controller 310 determines that the task in question relates to untrusted content, i.e. is determined to be an untrusted task, then the controller 310 causes the untrusted task to be opened in a task isolation environment or sandbox 350. The controller 310 may cause a task isolation environment 350 to be provisioned. The isolation environment 350 may be configured based on configuration settings provided by the policy unit 330. Suitably, the policy unit 330 stores policies relevant to each identifiable task which is capable of being intercepted by the task interceptor units 320. Thus, the computer device 200 is capable of implementing different types of task isolation environments, each having different configurations, based on the policy settings.

Where a new task isolation environment is required, then such a task isolation environment 350 is provisioned by the controller 310, suitably by instructing the provisioner unit 340. The provisioner unit 340 provisions the new task isolation environment 350 by programmatically creating user credentials for a new user account 121b on the computer device 200, and presenting those created user credentials to the operating system 202. Suitably, the new user account 121b is a temporary user account with a programmatically created password set by the provisioner 340. For example, the provisioner 340 may generate the password as a random or pseudo-random character string. The content isolation agent 300 automatically provides these user credentials to generate the temporary user account 121b. Thus, the computer device 200 now contains the original user account 121 of the original logged in user, as a first user account or primary user account. The device also now contains a second user account 121b, namely the temporary user account or secondary user account, which has been programmatically created by the provisioner 340. The temporary user account 121b has a corresponding access token 122b, created by logging on with the credentials of the temporary user account 121b as just created. The task isolation environment 350 thus includes the temporary user account 121b in which tasks may be executed safely and in isolation from protected resources of the computer system 200, as will be discussed in more detail below.

In one example, the access token 122b of the temporary user account 121b is granted rights to the desktop user interface 204 (e.g. via a window station object) of the logged in user account 121, enabling untrusted tasks running under the temporary user account 121b to be displayed on the same desktop of the current user 121. The isolated tasks 120b in the task isolation environment 350 may be displayed simultaneously with trusted tasks 120 which are already being executed, or which are to be executed later, by this logged on user account 121.

In one example, the controller 310 launches the intercepted task now inside the task isolation environment 350 provided by the temporary user account 121b. Thus, the untrusted task launches processes 120b which are associated with the access token 122b of the temporary user account 121b. Notably, the security module 210 of the operating system 202, which is conveniently native to the computer system 200, now is leveraged to isolate this untrusted task away from content of the main user account 121.

By default, the isolation environment 121b provided by the temporary user account 121b will not enjoy access to the profile and data of the logged in user account 121, and vice versa. Further, the temporary user account 121b is suitably given minimal standard privileges, i.e. without administrative access, and is isolated from resources of the operating system 202.

The untrusted task now runs in this temporary user account 121b and accesses the profile of the temporary user for both data access and registry access. Any malicious activity only affects the temporary user account 121b and does not affect the primary user account 121.

In one example embodiment, the temporary user account 121b is non-persistent. The temporary user account 121b may be completely deleted after use. That is, the controller 310 may determine that the temporary user account 121b is no longer needed, and may delete the temporary user account 121b from the computer device 200, thus removing all traces of the untrusted task and untrusted content. When the user wishes to repeat the untrusted task again, associated with the untrusted content, again a new task isolation environment is provisioned as discussed herein and the task is run within that new task isolation environment.

In another example embodiment, the task isolation environment 350 may be persistent between sessions. That is, the controller 310 may choose to maintain a particular isolation environment 350 over one or more sessions, thus providing continuity for the user for a relevant task. In one example, a session is started by the real user logging in to the computer device, and concluded by the user logging out.

Figure 5:
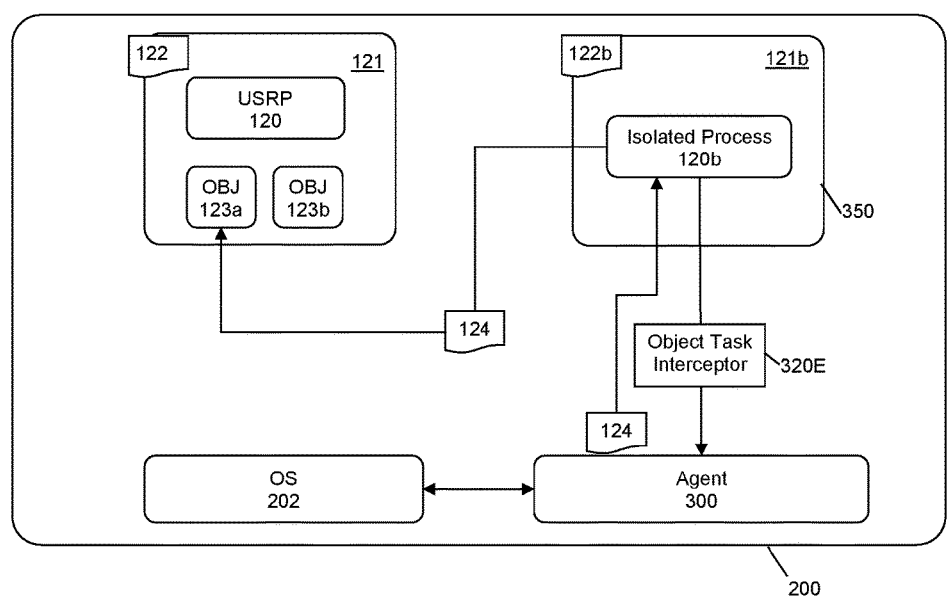
FIG. 5 is a further schematic view of the example computer device.

FIG. 5 is a further schematic view of the computer device. As shown in FIG. 5, the primary user account 121 may be associated with one or more named objects 123a, 123b. In this example, a difficulty arises in that an application executing in the isolation environment 350 is unable to access the named objects 123a, 123b which are associated instead with the primary user account 121.

In many operating systems, such as Windows, named objects are used for inter-process communication and synchronization. Typical objects include events, semaphores, mutexes, waitable timers and file-mapping (sections). Each process in a particular user session (i.e. with the same Terminal Service session id) creates or opens named objects in a namespace of the user session. This user session namespace is secured with the user's logon SID. As described above, a process 120b running in an isolation environment 350 shares the session id of the primary user account 121, but will have a different logon SID, and therefore by default does not have access to the namespace of the primary user account 121.

To provide access for the isolated processes 120b to the user session namespace, each operation to open or create a named object (i.e. an object create or an object open operation) is intercepted, by an appropriate task interceptor 320E, and an access request message is sent to the agent 300. Notably, the task interceptor 320E is provided in relation to the isolation environment 350, but otherwise may be similar to the task interceptors 320A-D discussed above. The agent 300 checks the policy rules (for example via the policy unit 330 discussed herein) to ensure that access to the requested object 123a is allowed and, if granted, the agent 300 replies to the requesting process 120b with an impersonation token 124 that has access to the relevant namespace. The thread of this isolated process 120b then calls the respective 'create' or 'open' operation using the security context now provided by the impersonation token 124. In this example, the impersonation token 124 is discarded after the create/open operation and the thread reverts back to its original security context 121b. As a consequence, only a resultant handle has access to the object, therefore preventing escalated access by that process 120b to other objects within the session namespace of the primary user.

Figure 6:
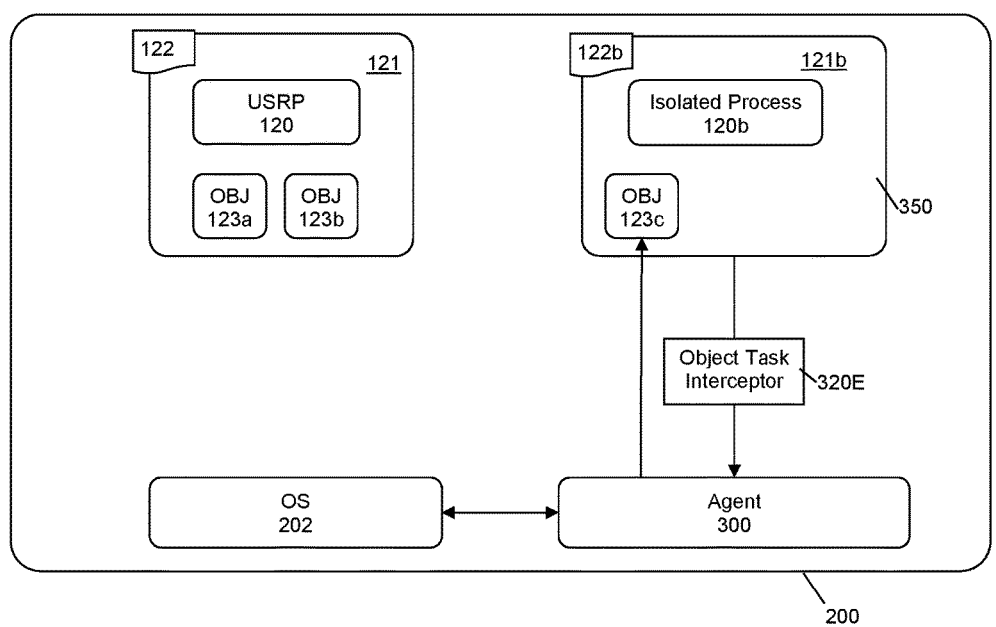
FIG. 6 is a further schematic view of the example computer device.

FIG. 6 is a further schematic view of the computer device in operation. In this example, the process 120b in the isolation environment 350 desires to create a named object 123c, which will then exist within the isolation environment. In this situation, a name of the object 123c is virtualized by the agent 300, to ensure that the name of this object does not conflict with a named object 123a in the session of the primary user having the same original object name. In more detail, a 'create object' request made by the isolated process 120b is intercepted by the agent 300 (e.g. by providing an appropriate task interceptor 320E in the isolation environment 350). The name of the requested object is amended by the agent 300 and the agent 300 replies to the requesting process 120b with the modified name for the object 123c. For example, the name of the object is modified by prepending or appending additional elements, such as the SID of the isolation environment 350. The thread of this isolated process 120b then continues with the call to the operating system 202 to create the object with the modified name provided by the agent 300, thus creating the desired named object 123c in the isolation environment 350.

When the isolated process 120b opens a desired object, the 'open' operation is intercepted by the task interceptor 320E and the modified name is inserted by the agent 300. The open object operation then continues to the operating system 202 using the modified name, thus leading to the object 123c within the isolation environment 350. Conversely, it is possible that the open operation will fail, because the desired object 123c does not exist within the isolation environment 350. Here, it is possible for the agent 300 to instead open the original named object, e.g. object 123a, where the permissions in the policy unit 330 are favourable, using the impersonation token mechanism discussed above in FIG. 5. This open operation thus now reaches the original object 123a, such as a system-wide object owned by the operating system 202, for example. Hence, by selectively opening objects using the original name, or the modified name, as appropriate, controlled by the agent 300, access is provided for the isolated process 120b either to the local object 123c having the modified object name, or, when expressly permitted, to the original named object 123a.

This virtualization, using modified names, is significant in ensuring that a particular application (e.g. Adobe Acrobat Reader) is isolated from other instances of the same application within the same user session (e.g. other instances of Adobe Acrobat Reader in another isolation environment or in the primary user's context). Notably, many applications use named objects to communicate with one another, or to restrict the number of instances of an application. Hence, controlling access to named objects allows the computer device 200 to function on a practical level, and achieve the functions desired by the user, while maintaining effective isolation.

Device Access Control

Figure 7:
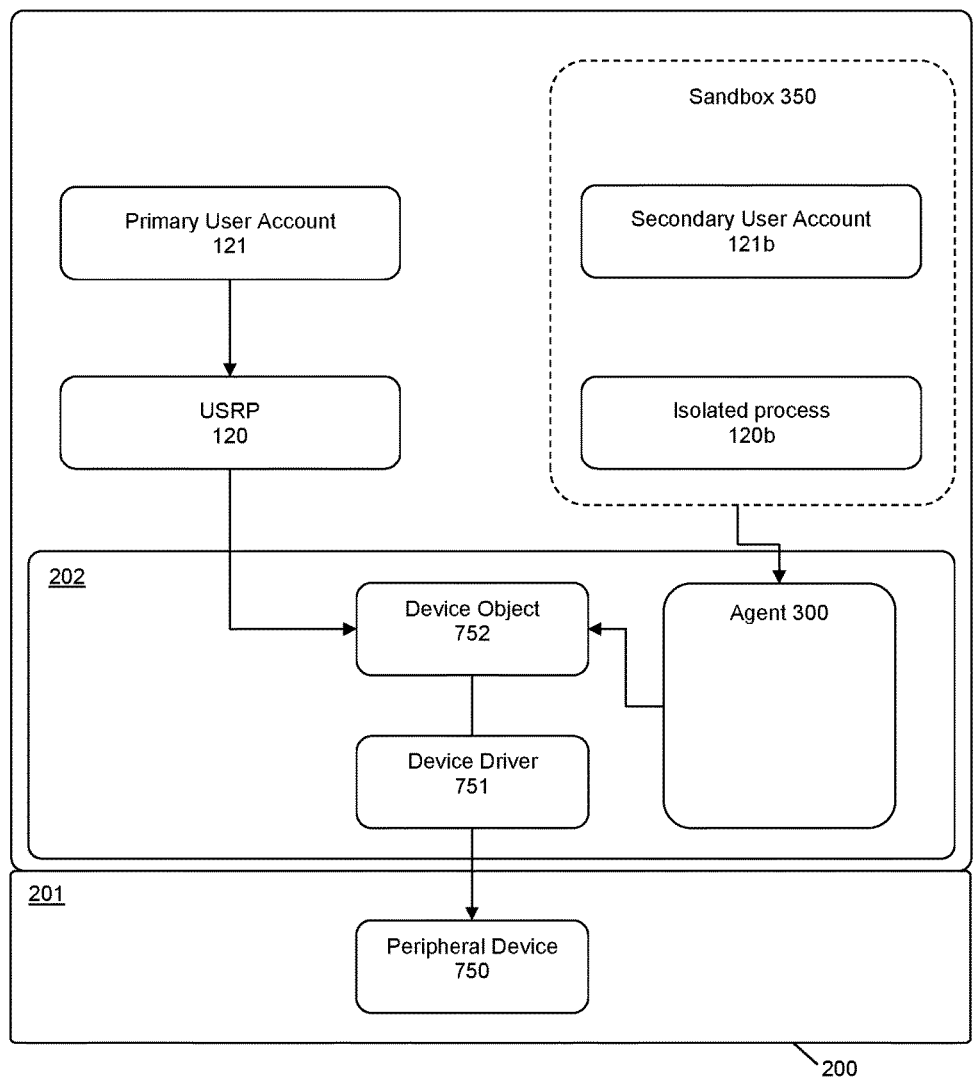
FIG. 7 is a further schematic view of the example computer device.

FIG. 7 is a further schematic view of the computer device 200. In this example the computer device 200 is adapted in order to control access to a peripheral device 750 connected thereto, such as a microphone or camera (e.g. a webcam). Thus, the computer device 200 is better protected from malicious attacks related to the peripheral device 750.

In this example, the computer device 200 includes at least one user process 120 running under the primary user account 121. Also, the computer device 200 comprises a device object 752, which may have been created by the OS 202 for the peripheral device 750 in the manner known in the art. By default, under the normal behaviour of most conventional operating systems, the user process 120 running under the primary user account 121 would be able to access the peripheral device 750 by accessing the related device object 752.

In this embodiment, the computer device 200 further includes at least one secondary user account 121b, which may have been created to implement the task isolation environment or sandbox 350 in the manner described herein. In this example, at least one isolated process 120b is provided, running in the secondary user account 121b. Notably, by default, the isolated process 120b running in the sandbox user account 121b would also be able to access the peripheral device 750 by accessing the related device object 752, which introduces a vulnerability or vector of attack.

In one example embodiment, the computer device 200 is adapted such that the device object 752 is isolated from the isolated process 120b running in the sandbox 350. In one example, the device object 752 has a security context and is accessible only by processes which are provided in the same security context as the device object 752. In other examples as discussed below, certain forms of access are selectively permitted (or denied) across contexts, i.e. from the context of the secondary user account 121b into the context of the device object 752. In these examples, as discussed below, the computer device 200 may be configured to selectively and securely control access to the device object 752 from the isolated process 120*b* running in the sandbox 350.

In one example mode of operation, the computer device 200 is configured to intercept a device object operation request originating from the secondary user account 121*b*, and to deny that request. Alternatively, the computer device 200 is configured to satisfy that intercepted request by using the device object 752. Optionally, the computer device 200 may be configured to modify the intercepted request and to satisfy the modified request by using the device object 752 or by redirecting the modified request. Further, the computer device 200 may be configured to intercept each device object operation request, from each security context, and to selectively allow, deny, modify or redirect the intercepted device object operation requests as appropriate. Thus, for example, a device object operation request originating from the primary user account 121, e.g. from the user process 120, may be intercepted and then satisfied by using the device object 752. By contrast, a device object operation request originating from the isolated process 120*b* in the secondary user account 121*b*, may be intercepted and then satisfied by using the device object 752, or may be selectively denied, modified or redirected as appropriate.

Interestingly, the computer device 200 of the example embodiments still provides a satisfactory user experience in terms of using peripheral devices. At the same time, this controlled access to the peripheral devices maintains security and isolation of potentially malicious code by being able to deny or restrict potentially insecure device object operations originating from the sandbox 350.

Figure 8:
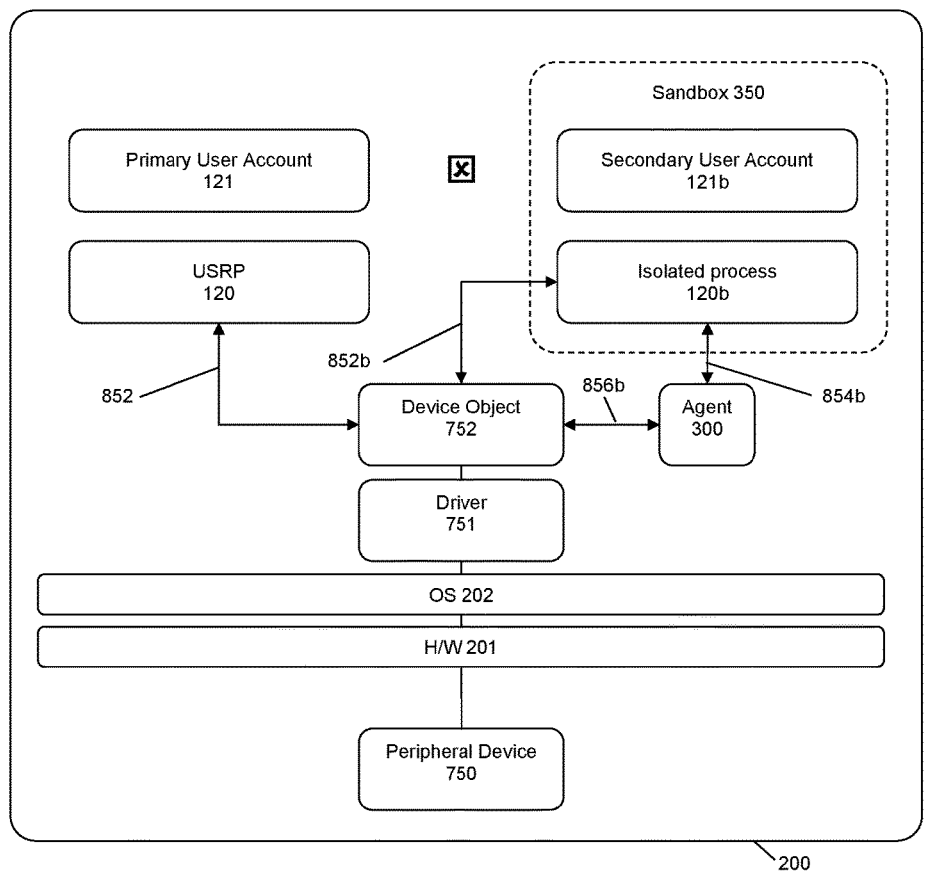
FIG. 8 is a further schematic view of the example computer device.

FIG. 8 is a further schematic view of the computer device 200 in more detail. In this example, the computer device 200 is configured to implement additional security refinements related to the device object 752, which provide enhanced control over access to the peripheral device 750, according to the respective contexts of operations which are directed towards the peripheral device 750.

Typically, the peripheral device 750 is connected to the computer device 200 to become treated as part of the hardware 201. Further, the computer device 200 comprises a device driver 751 for the peripheral device 750, which works with the operating system 202 as described above. The operating system 202 may provide the device object 752 (for example, using a kernel to provide the device object 752), which is associated with the device driver 751 and with the peripheral device 750. By default, as described above, the device object 752 is accessible by all processes running on the computer device 200. Thus, the device object 752 is by default accessible by the user process 120 associated with the primary user account 121, and also by the isolated process 120*b* associated with the secondary user account 121*b* in the sandbox 350.

In one example, the device object 752 may be programmatically configured with security attributes (SA) derived according to a security identifier (SID) of the user. These security attributes may further include the SIDs of any other security groups to which the user belongs. Thus, the device object 752 is provided with an associated security context. In this way, the computer device 200 may permit an operation between processes and peripheral devices wherein the same or compatible security attributes are exhibited, i.e. security attributes derived from the same SID. Conversely, the computer device 200 may deny peripheral device operations between processes and peripheral devices where different or incompatible security attributes are involved, i.e. derived from different SIDs. That is, the operating system 202 may only permit access to the device object 752 by certain processes which have the same security context as the device object 752.

For illustration, in one practical example the device object 752 may be created by the computer device 200 running on a Microsoft Windows type operating system and security attributes of the device object 752 may be configured by binding an appropriate security descriptor to the device object 752. An example call is shown below:

```
BOOL SetupDiSetDeviceProperty(
    _In_      HDEVINFO         DeviceInfoSet,
    _In_      PSP_DEVINFO_DATA DeviceInfoData,
    _In_      const DEVPROPKEY  *PropertyKey,
    _In_      DEVPROPTYPE      PropertyType,
    _In_opt_  const PBYTE      PropertyBuffer,
    _In_      DWORD            PropertyBufferSize,
    _In_      DWORD            Flags
);
``` where DeviceInfoSet is a handle to a device information set, representing the device object 752; DeviceInfoData is a pointer to a SP_DEVINFO_DATA structure that identifies the device object 752 for which to set a device instance property; PropertyKey is a pointer to a DEVPROPKEY structure that represents a device property key of the device instance property to set; PropertyType is a DEVPROPTYPE-typed value that represents a property-data-type identifier for the device instance property; PropertyBuffer is a pointer to a buffer that contains a device instance property value; PropertyBufferSize is a size, in bytes, of the PropertyBuffer buffer; and Flags would be set to zero.

Particularly, the PropertyBuffer pointer points to a Security Descriptor Definition Language (SDDL) string that comprises the security descriptor. For example, a simple security descriptor may be represented by the SDDL string: 'D:P(X;;ACCESS_STR;;;SID_STR' where X is 'A' to grant access or 'D' to deny access, ACCESS_STR may be simple e.g. 'GW' (generic write) or complex e.g. 'GRGWGE' (generic read, write and execute) and SID_STR may be a string for a known SID of a user or a group. Alternatively, a complex security descriptor may be made up of multiple simple security descriptors and represented by the SDDL string, e.g.:

```
'D:P(X1;;ACCESS_STR1;;;SID_STR1)(X1;;ACCESS_STR2;;;
        SID_STR2)(X3;;ACCESS_STR3;;;SID_STR3)'
```

The SDDL string may be programmatically created from the known SID of the user or the group using a Windows Authorisation API and validated before use.

In one example, the operating system 202 may by default deny access to the device object 752 from an untrusted process (e.g. the isolated process 120*b*). Here, the isolated process 120*b* may be associated with a particular custom user SID or custom group SID. Access is denied by including a flag to deny access to said custom user or group SID (e.g. where X is D' in the SDDL string).

Conversely, by including a flag to grant access to a trusted user or group SID (e.g. where X is 'A' in the SDDL string), the operating system 202 may by default grant access to the device object 752 from a process (e.g. user process 120 having the access token 122) associated with the trusted user or group SID (e.g. the SIDs associated with primary user account 121).

In this way, the security descriptor applied to the device object 752 may be configured to allow access to the device object 752 from trusted users or groups while also denying access from untrusted users or groups. For example, the security descriptor applied to the device object 752 may be configured to deny access to the isolated process 120*b* running in the secondary user account 121*b*, since the isolated process 120*b* may include a denied group SID in the access token 122*b*.

The operating system 202 may examine the security descriptor applied to the device object 752, i.e. the SDDL string, which may be stored as an access control entry (ACE) in a DACL (discretionary access control list) associated with the peripheral device 750, until a relevant event occurs. For example, the relevant event may comprise explicitly denying access, explicitly granting access or implicitly denying access. The operating system 202 uses this event algorithm to grant or to deny a thread of a process (e.g. isolated process 120*b*) access to the device object 752 regardless of a method in which an access token (e.g. access token 122*b* associated with the isolated process 120*b*) was bound to the thread. For example, the access token may be bound to the thread by primary assignment (or kernel assignment) or by impersonation tokens. Particularly, where the security descriptor is configured to deny access to the device object 752 from untrusted users or groups e.g the isolated process 120*b* running in the secondary user account 121*b*, the operating system 202 may by default isolate access to the device object 752 from the untrusted users or groups e.g the isolated process 120*b* running in the secondary user account 121*b*.

Additionally, in this example, the computer device 200 configures the security attributes of the device object 752 according to the SIDs associated with the primary user account 121. Hence, due to these differences between the security attributes of the primary user account 121 as against those of the secondary user account 121*b*, the operating system 202 will now only permit certain processes (i.e. the user process 120), having the same security context 121 as the primary user account 121, to access the device object 752. In contrast, the operating system 202 will now deny certain processes (i.e. the isolated process 120*b*), having a different security context 121*b*, from accessing the device object 752.

In one example, the computer device 200 may be configured to set the security attributes of the device object 752 using the agent 300 discussed previously. Particularly, considering the components of the agent 300 discussed above, the controller 310 may suitably instruct the provisioner unit 340 to configure the security attributes of the device object 752. For example, the provisioner unit 340 may create an appropriate security descriptor as described above according to the security attributes of the primary user account 121 and the DACL and apply the newly-created security descriptor to the device object 752, so as to limit which processes may access the device object 752. That is, as described above, the security attributes of the device object 752 may be set such that by default, the operating system 202 may allow access to the device object 752 from the user process 120 running in the primary user account 121 while isolating access to the device object 752 from the isolated process 120*b* running in the secondary user account 121*b*.

Additionally, in one example, the agent 300 may also modify the security attributes of the device object 752. For example, the controller 310, with suitable access rights, may cause the security attributes of the device object 752 to be modified, so as to limit which processes may access the device object 752, as described above.

Generally, an operation of the computer device 200 may be modified by intercepting function calls or messages or events related to the operation. For example, a response or functionality of the operating system 202 related to the peripheral device 750 may be modified by intercepting (or hooking) function calls of the device object API or messages or events related to the device object 752.

In one example, the agent 300 is configured to intercept a peripheral device operation request originating from the isolated process 120*b* and to deny the intercepted request. For example, the task interceptor 320E discussed above may be configured to intercept the device object API calls from the isolated process 120*b*. The agent 300 may be configured to deny the intercepted request, when it is determined that the request is directed towards the device object 752. For example, the agent 300 may be configured to check the policy rules via the policy unit 330 and, if denied, the agent 300 may deny the intercepted request.

In more detail, the task interceptor 320E may intercept a peripheral device operation request from the isolated process 120*b*, relating to the request for the device object 752, as at operation 852*b*. The task interceptor 320E communicates the intercepted request to the controller 310. The controller 310 checks with the policy unit 330 and in response to a 'denied' result, the controller 310 returns a denied response to the isolated process 120*b*.

However, when the security attributes of the device object 752 have been set as described above so as to limit which processes may access the device object 752 and particularly, to deny access from isolated process 120*b* running in the secondary user account 121*b*, it may not be necessary for the agent 300 to intercept and/or deny the request in which the request would be otherwise denied by default by the operating system 202, as described above.

Conversely, in one example, the agent 300 is configured to intercept a peripheral device operation request originating from the isolated process 120*b* and to permit the intercepted request. For example, the device object API calls from the isolated process 120*b* may be intercepted as described above and the agent 300 may be configured to permit the intercepted request, when it is determined that the request is directed towards the device object 752. For example, the agent 300 may be configured to check the policy rules via the policy unit 330 and, if permitted, the agent 300 may allow the intercepted request by controlling the computer device 200 to allow the intercepted request from the isolated process 120*b* directed towards the device object 752. Particularly, the agent 300 may control the computer device 200 to allow the intercepted request by privileging access from the isolated process 120*b* to the device object 752 by proxy or by impersonation.

In more detail, the task interceptor 320E may intercept and communicate the peripheral device operation request as described above. The controller 310 checks with the policy unit 330 and in response to an 'allow' result, the controller 310 controls the computer device 200 to allow the intercepted request from the isolated process 120*b* directed towards the device object 752.

In one example, the agent 300 may then privilege access from the isolated process 120*b* to the device object 752 by proxy, in which the agent 300 may proxy the intercepted request by the controller 310 forwarding a proxy request to the device object 752, as at operation 856*b*. Specifically, since the proxy request originates from the agent 300 and since a security context of the agent 300 is compatible with the security context of the device object 752, the proxy request is allowed by the operating system 202. The agent 300 subsequently returns a result of the proxy request to the isolated process 120*b*, as at operation 854*b*. For example, the proxy request may return a handle to the device object 752 and in turn, the agent 300 forwards the handle to the isolated process 120*b*. In this way, the isolated process 120*b* running in the sandbox 350 may access the peripheral device 750.

Alternatively, in one example, the agent 300 may instead privilege access from the isolated process 120*b* to the device object 752 by impersonation, in which the agent 300 may create a privileged impersonation token for the isolated process 120*b*. Specifically, the agent 300 may satisfy the intercepted request using the impersonation token mechanism discussed above with reference to FIG. 5. Particularly, an impersonation token 124 is created by the agent 300 and returned to the isolated process 120*b*. This impersonation token 124 is then assigned to a thread of the isolated process 120*b* to allow the intercepted request to succeed. Hence, the isolated process 120*b* running in the sandbox 350 may now access the peripheral device 750, as privileged by the impersonation token 124. Notably, this impersonation token privileging mechanism advantageously minimises a complexity of handling the intercepted request compared with the proxy privileging mechanism, since a number of parameters associated with the intercepted request and handled by the agent 300 is reduced.

In one example, the agent 300 may be configured to determine which peripheral devices are connected to the computer device 200. In one example, the agent 300 may be further configured to store details of one or more of these connected peripheral devices. In one example, the agent 300 may be additionally configured to set security attributes of one or more of these peripheral devices. Importantly, all of the connected peripheral devices may thus be isolated from processes running in the sandbox 350. Further in one example, the agent 300 may be configured to set the security attributes for the determined set of connected peripheral devices at start up or restart of the computer device 200, thereby isolating these peripheral devices before an untrusted process (e.g. isolated process 120*b*) may attempt to access one of these peripheral devices.

In one example, the agent 300 may be configured to determine when a new peripheral device is newly-connected to the computer device 200 and to set security attributes of the newly-connected peripheral device. Since, as noted previously, it not possible to deny access to the newly-connected peripheral device if that newly-connected peripheral device is already being accessed, the agent 300 may be thus configured to set the relevant security attributes before any other process attempts to access the newly-connected peripheral device.

In summary, by default the device object 752 has little or no security and is exposed to malicious code which is supposedly isolated in the secondary user account 121*b*. Applying the SID of the primary user account 120 to the device object 752 now isolates the device object 752 away from the isolated processed 120*b*. However, the isolated processes 120*b* would now not have access to any connected peripheral devices. Therefore, the agent 300 is configured to control the computer device 200 to deny or permit access to the device object 752 from the isolated processed 120*b*. When the isolated process 120*b* requests access to the device object 752, the call would fail by exhibiting an incompatible security context (incorrect SID). Therefore, the example mechanism performed by the agent 300 further intercepts the respective API call and determines whether to deny or allow the call. If the agent 300 determines that the call may be allowed, the agent 300 may then allow access from the isolated process 120*b* to the device object 752 by proxy (i.e. in which the agent 300 forwards the request to the device object 752 on behalf of the isolated process 120*b*) or by impersonation (i.e. in which the agent 300 replies to the requesting process 120*b* with the impersonation token 124 that has access to the device object 752).

It will be appreciated by those skilled in the art that controlling untrusted access to peripheral devices, such as peripheral device 750, advantageously isolates the peripheral devices from untrusted processes (i.e. running in the secondary user account 121*b* in the task isolation environment 350). Further, controlling untrusted access to the peripheral devices further permits selective access to the peripheral devices from the untrusted processes. In this way, the computer device 200 provides an appropriate user experience in terms of using peripheral devices while, at the same time, restricting malicious software running in the sandbox 350 from inappropriately accessing the peripheral devices.

Figure 9:
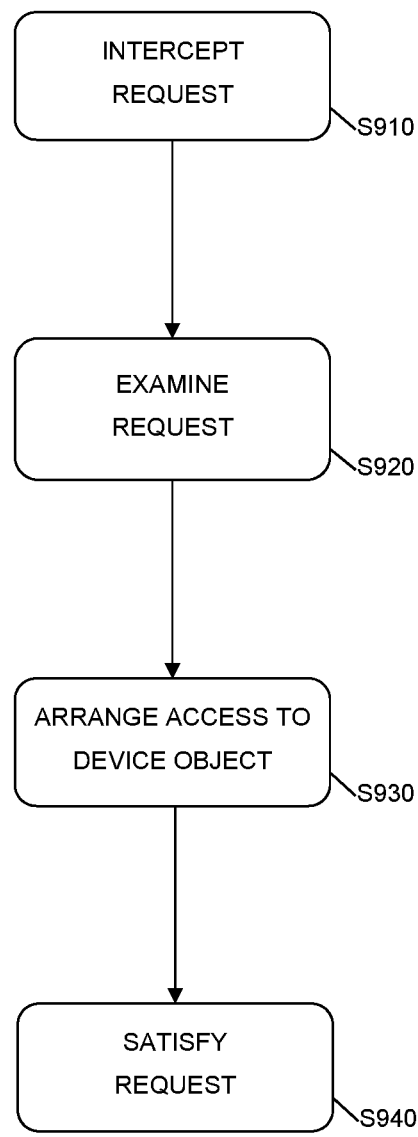
FIG. 9 is a schematic flowchart of an example method of operating the computer device.

FIG. 9 is a schematic flowchart of an example method. In this case, as described in more detail above, the method includes step S910 of intercepting the device object access request from the secondary user account prior to satisfying of the device object access request by the computer device, wherein the device object access request relates to an untrusted process. Step S920 includes examining the device object access request from the secondary user account to selectively allow or deny access to the peripheral device from the secondary user account. Step S930 includes arranging access to the device object if the device object access request from the secondary user account is allowed. Step S940 includes satisfying the device object access request using the device object. The step S930 may further include any of the steps discussed herein. In particular, the step S930 may include any of the steps discussed herein in relation to device object access requests from the secondary user account.

Figure 10:
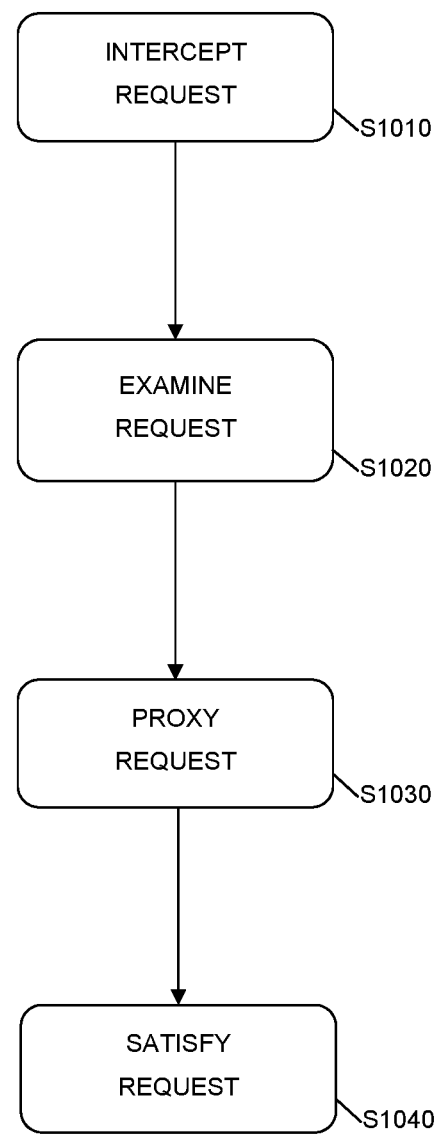
FIG. 10 is a schematic flowchart of another example method.

FIG. 10 is a schematic flowchart of another example method. In this case, as described in more detail above, the method includes step S1010 of intercepting the device object access request from the secondary user account prior to satisfying of the device object access request by the computer device. Step S1020 includes examining the device object access request from the secondary user account to selectively allow or deny access to the peripheral device from the secondary user account. Step S1030 includes arranging access to the device object if the device object access request from the secondary user account is allowed by proxying the device object access request. Step S1040 includes satisfying the device object access request using the device object. The step S1030 may further include any of the steps discussed herein. In particular, the step S1030 may include any of the steps discussed herein in relation to proxying the device object access request from the secondary user account. The step S1040 may further include any of the steps discussed herein. In particular, the step S1040 may include any of the steps discussed herein in relation to device object access requests from the secondary user account.

Figure 11:
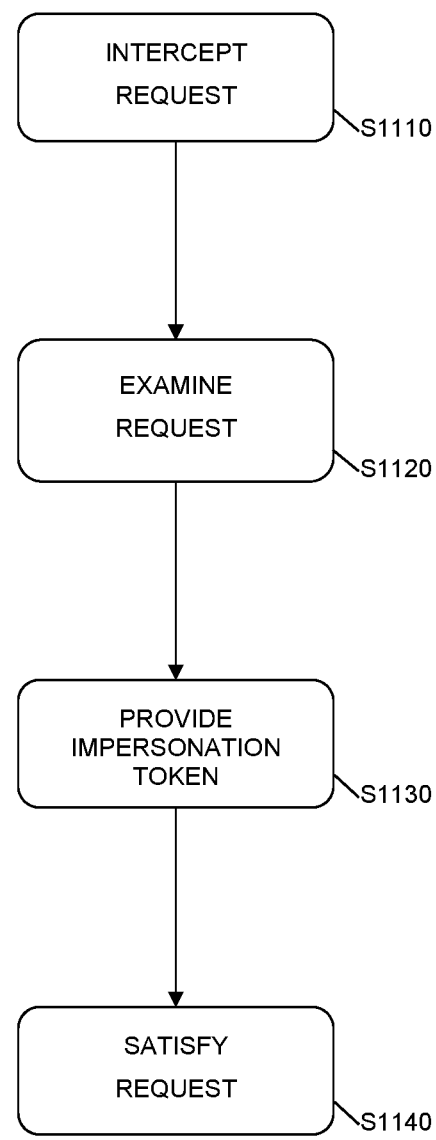
FIG. 11 is a schematic flowchart of another example method.

FIG. 11 is a schematic flowchart of a further example method. In this case, as described in more detail above, the method includes step S1110 of intercepting the device object access request from the secondary user account prior to satisfying of the device object access request by the computer device. Step S1120 includes examining the device object access request from the secondary user account to selectively allow or deny access to the peripheral device from the secondary user account. Step S1130 includes arranging access to the device object if the device object access request from the secondary user account is allowed by providing an impersonation token. Step S1140 includes satisfying the device object access request using the device object. The step S1130 may further include any of the steps discussed herein. In particular, the step S1130 may include any of the steps discussed herein in relation to impersonating the device object access request from the secondary user account, by providing the impersonation token. The step S1140 may further include any of the steps discussed herein. In particular, the step S1140 may include any of the steps discussed herein in relation to device object access requests from the secondary user account.

In summary, the example embodiments have described an improved mechanism to control untrusted access to a peripheral device connected to a computer device. The industrial application of the example embodiments will be clear from the discussion herein.

Advantageously, this improved mechanism prevents malware from hijacking the peripheral device, potentially for nefarious purposes such as to obtain personal or confidential information. The access control described herein precludes malware from accessing the peripheral devices through calling functions, independently of any request originating from the user, that are typically allowable by operating systems. Hence, malicious software may not access the webcam connected to the computer device and thus may neither monitor nor record the user or the environment of the computer device without any knowledge of the user. Additionally, such malicious software is denied access to the microphone connected to the computer device and is therefore unable to surreptitiously monitor or record the user or the surroundings. Further, malware may no longer access the keyboard connected to the computer device and is stopped from covertly recording keystrokes.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A computer device, comprising:
   a hardware layer comprising a processor, a memory, and a peripheral device;
   an operating system executed by the hardware layer, wherein the operating system:
   supports the peripheral device using a device driver which drives the peripheral device and a device object as a security object representing the peripheral device in the operating system;
   operates a primary user account comprising a user process, wherein the device object is accessible by the user process; and
   provisions a secondary user account, derived from the primary user account, wherein the secondary user account is a secure execution environment that isolates an untrusted process; and
   an agent as an intermediary executed in cooperation with the operating system, the primary user account and the secondary user account, wherein the agent:
   applies security attributes to the device object in the operating system which permit access to the device object by the primary user account while preventing direct access to the device object by the secondary user account;
   intercepts a request from the secondary user account made toward the device object in relation to an operation of the peripheral device;
   examines the request and determines whether to allow or deny access to the peripheral device from the secondary user account; and
   satisfies the request, when the request is allowed, by arranging indirect access to the device object, thereby performing the operation of the peripheral device as requested from the secondary user account.

2. The computer device according to claim 1, wherein the security attributes of the device object are derived according to a security identifier of the secondary user account.

3. The computer device according to claim 2, wherein the security attributes of the device object are derived according to the security identifier of the secondary user account to explicitly deny access to the peripheral device from the secondary user account.

4. The computer device according to claim 1, wherein the security attributes of the device object are derived according to a security identifier of the primary user account.

5. The computer device according to claim 4, wherein the security attributes of the device object are derived according to the security identifier of the primary user account to explicitly permit access to the peripheral device from the primary user account.

6. The computer device according to claim 1, wherein the agent is configured to examine the request to selectively allow or deny access to the peripheral device from the secondary user account by checking a policy rule.

7. The computer device according to claim 1, wherein the agent is configured to determine a type of the peripheral device and to apply the security attributes to the device object according to the type of the peripheral device.

8. The computer device according to claim 1, wherein the agent is configured to determine when the peripheral device is newly-connected to the computer device and to apply the security attributes to the device object before the request from the secondary user account is made toward the device object.

9. The computer device according claim 1, wherein the agent is configured to satisfy the request by acting as a proxy for the request, wherein the agent is configured to forward a proxy request in response to the request from the secondary user account.

10. The computer device according to claim 1, wherein the agent is configured to satisfy the request by providing an impersonation token to the secondary user account.

11. A method for controlling access to a peripheral device on a computer device, the method being implemented by hardware of the computer device including at least a processor and a memory, the method comprising:
    supporting the peripheral device using a device driver which drives the peripheral device and a device object as a security object representing the peripheral device in an operating system of the computer device;
    operating a primary user account comprising a user process, wherein the device object is accessible by the user process;
    provisioning a secondary user account, derived from the primary user account, wherein the secondary user account is a secure execution environment which isolates an untrusted process;
    applying security attributes to the device object in the operating system which permit access to the device object by the primary user account while preventing direct access to the device object by the secondary user account;
    intercepting a request from the secondary user account made toward the device object in relation to an operation of the peripheral device;
    examining the request and determining whether to allow or deny access to the peripheral device from the secondary user account; and
    satisfying the request, when the request is allowed, by arranging indirect access to the device object in the operating system, thereby performing the operation of the peripheral device.

12. The method according to claim 11, wherein the security attributes of the device object are derived according to a security identifier of the secondary user account.

13. The method according to claim 12, wherein the security attributes of the device object are derived according to the security identifier of the secondary user account to deny access to the peripheral device from the secondary user account.

14. The method according to claim 11, wherein the security attributes of the device object are derived according to a security identifier of the primary user account.

15. The method according to claim 14, wherein the security attributes of the device object are derived according to the security identifier of the primary user account to permit access to the peripheral device from the primary user account.

16. The method according to claim 11, wherein the method further comprises determining a type of the peripheral device and applying the security attributes to the device object according to the type of the peripheral device.

17. The method according to claim 11, wherein the method further comprises determining when the peripheral device is newly-connected to the computer device and applying the security attributes to the device object before the request from the secondary user account is made toward the device object.

18. The method according to claim 11, wherein satisfying the request comprises acting as a proxy for the request, comprising forwarding a proxy request in response to the request from the secondary user account.

19. The method according to claim 11, wherein satisfying the request comprises providing an impersonation token to the secondary user account.

20. A non-transitory computer readable storage medium having recorded thereon instructions which, when implemented by a computer device perform a process for controlling access to a peripheral device, the process including:
    supporting a peripheral device using a device driver which drives the peripheral device and a device object as a security object representing the peripheral device in an operating system of the computer device;
    operating a primary user account comprising a user process, wherein the device object is accessible by the user process;
    provisioning a secondary user account, derived from the primary user account, wherein the secondary user account is a secure execution environment which isolates an untrusted process;
    applying security attributes to the device object in the operating system which permit access to the device object by the primary user account while preventing direct access to the device object by the secondary user account;
    intercepting a request from the secondary user account made toward the device object in relation to an operation of the peripheral device;
    examining the request and determining whether to allow or deny access to the peripheral device from the secondary user account; and
    satisfying the request, when the request is allowed, by arranging indirect access to the device object in the operating system, thereby performing the operation of the peripheral device.

* * * * *